(12) United States Patent
Petruccioli et al.

(10) Patent No.: US 12,713,995 B2
(45) Date of Patent: Aug. 25, 2026

(54) SEEDING TOOL

(71) Applicant: Ausplow Pty. Ltd., Cockburn Central (AU)

(72) Inventors: Aldo Petruccioli, Cockburn Central (AU); Christopher Blight, Cockburn Central (AU); Raymond Beacham, Cockburn Central (AU); Brett Lovell, Cockburn Central (AU); John William Ryan, Cockburn Central (AU)

(73) Assignee: Ausplow Pty. Ltd., Cockburn Central (AU)

( * ) Notice: Subject to any disclaimer, the term of this patent is extended or adjusted under 35 U.S.C. 154(b) by 439 days.

(21) Appl. No.: 18/222,689

(22) Filed: Jul. 17, 2023

(65) Prior Publication Data

US 2024/0032451 A1 Feb. 1, 2024

(30) Foreign Application Priority Data

Jul. 28, 2022 (AU) ................................ 2022902126

(51) Int. Cl.
*A01B 63/22* (2006.01)
*A01B 63/00* (2006.01)
(Continued)

(52) U.S. Cl.
CPC ........ *A01B 63/1112* (2013.01); *A01B 63/008* (2013.01); *A01B 63/22* (2013.01); *A01C 7/203* (2013.01); *A01C 7/208* (2013.01)

(58) Field of Classification Search
CPC ....... A01B 63/008; A01B 63/10; A01B 63/11; A01B 63/22; A01B 63/32; A01B 63/1112;
(Continued)

(56) References Cited

U.S. PATENT DOCUMENTS 3,912,018 A * 10/1975 Brundage .............. B60G 17/00 172/396
4,145,980 A * 3/1979 Boots ..................... A01C 7/208 111/926
(Continued)

FOREIGN PATENT DOCUMENTS

CN 113575043 B 9/2022
EP 2436251 A1 * 4/2012 ........... A01D 80/005
(Continued)

OTHER PUBLICATIONS

"Search Report received in Application No. GB2308958.4, Nov. 24, 2023."

*Primary Examiner* — Alicia Torres
(74) *Attorney, Agent, or Firm* — ALG Intellectual Property, LLC

(57) ABSTRACT

A seeding tool includes: a frame supported by a frame wheel so that the frame is pivotable about a wheel axis; a plough assembly attached to a rear portion of the frame and including a seed boot for planting seeds in a soil bed at a desired depth; a fixed drawbar hingedly attached to a front portion of the frame so that the drawbar is pivotable about a drawbar axis parallel to the wheel axis; a front height sensor attached to the front portion of the frame to provide a front height signal; a rear height sensor attached to the rear portion of the frame to provide a rear height signal; an actuator located between the fixed drawbar and the frame operable to adjust an angle between the fixed drawbar and the frame to level the frame relative to the soil bed based on the front and rear height signal.

13 Claims, 5 Drawing Sheets

(51) Int. Cl.
*A01B 63/111* (2006.01)
*A01C 7/20* (2006.01)

(58) Field of Classification Search
CPC ....... A01B 63/114; A01B 49/06; A01C 5/062; A01C 5/068; A01C 7/203; A01C 7/208
See application file for complete search history.

(56) References Cited

U.S. PATENT DOCUMENTS

| | | | | |
|---|---|---|---|---|
| 5,161,472 | A * | 11/1992 | Handy .................. | A01C 5/062 111/900 |
| 9,253,937 | B2 * | 2/2016 | Horsch ................ | A01B 73/048 |
| 9,271,440 | B2 * | 3/2016 | Turko .................... | A01C 5/068 |
| 9,980,422 | B2 * | 5/2018 | Czapka ................ | A01B 59/042 |
| 10,178,822 | B2 | 1/2019 | Ryan | |
| 10,440,876 | B2 * | 10/2019 | Sporrer .................. | A01B 63/14 |
| 10,750,653 | B2 | 8/2020 | Sporrer et al. | |
| 2008/0257570 | A1 * | 10/2008 | Keplinger ............ | A01B 63/145 172/7 |
| 2018/0153088 | A1 | 6/2018 | Sporrer et al. | |
| 2020/0100420 | A1 | 4/2020 | Sporrer et al. | |
| 2020/0116479 | A1 | 4/2020 | Shearer et al. | |
| 2020/0352081 | A1 * | 11/2020 | Arnett .................... | A01B 21/08 |
| 2021/0298216 | A1 | 9/2021 | Kovach | |

FOREIGN PATENT DOCUMENTS

| | | | | |
|---|---|---|---|---|
| WO | WO-0195698 | A1 * | 12/2001 | ............. A01B 63/32 |
| WO | 2021089197 | A1 | 5/2021 | |

* cited by examiner

SEEDING TOOL

RELATED APPLICATIONS

This application claims priority to Australian Provisional Patent Application No. 2022902126, filed Jul. 28, 2022, the contents of which are incorporated herein in their entirety by reference thereto.

FIELD This application relates to a seeding tool.

BACKGROUND

Maintaining a desired seed planting depth is a critical performance parameter for seeding tools. Planting seeds too deep or too shallow can have substantial effects on the yield achieved from the plants grown from the seeds. Mechanisms exist to adjust the position of the seed boot with respect to the soil surface adjacent the seed boot to provide compensation for local variations in soil geometry. Examples of such tools are disclosed in Australian Patent Application Nos. 2007202351 and 2021221492, which are incorporated herein in their entirety by reference thereto.

However, while such tools are capable of adjusting for local variations in soil geometry of each seeding boot, a seeding tool typically comprises an elongate frame with a plurality of seed boots attached, the frame being supported by a single row of wheels, thus allowing the elongate frame to pivot about the row of wheels. If a gradient change occurs along the elongate frame, the elongate frame will pivot about the row of wheels to a degree that is typically not compensable by the individual seed boot assemblies.

SUMMARY

It is an object of the present application to at least substantially address one or more of the above disadvantages, or at least provide a useful alternative to the above seeding tools.

In a first aspect a seeding tool for attachment to a vehicle to be drawn through a soil bed in a forward direction for planting seeds in the soil bed at a desired depth, the seeding tool including:

- a frame supported by a frame wheel so that the frame is pivotable about a wheel axis;
- a plough assembly attached to a rear portion of the frame, the plough assembly including a seed boot for planting seeds in the soil bed at the desired depth;
- a fixed drawbar hingedly attached to a front portion of the frame so that the drawbar is pivotable about a drawbar axis that is parallel to the wheel axis;
- a front height sensor attached to the front portion of the frame to provide a front height signal;
- a rear height sensor attached to the rear portion of the frame to provide a rear height signal; and an actuator located between the fixed drawbar and the frame operable to adjust an angle between the fixed drawbar and the frame to level the frame relative to the soil bed based on the front and rear height signal.

Preferably, the front height sensor includes a first and a second front height sensor, and the rear height sensor includes a first and a second rear height sensor.

Preferably, the actuator is a hydraulic actuator, and the seeding tool further includes a digitally controlled hydraulic valve, adapted to operate the actuator to adjust the angle to level the frame relative to the soil bed.

Preferably, the actuator is operable to level the frame relative to the soil bed to maintain the seed boot at the desired depth within a tolerance of ±5 mm. Preferably, the fixed draw bar includes:

- a coupling portion for attaching the fixed draw bar to the vehicle;
- a lower beam extending from the coupling portion and hingedly attached to the frame;
- an upper beam extending from the coupling portion and hingedly connected to the actuator, such that movement of the actuator causes a moment about the hinged attachment of the lower beam to the frame.

Preferably, the plough assembly includes:

- a digging shank to extend downwardly into the soil bed;
- wherein the seed boot attached to the digging shank by at least two spaced parallel beams that are pivotally attached to the seed boot and the digging shank such that the seed boot is vertically movable relative to the digging shank by an adjustment distance; and
- a press wheel attached to the seed boot, to press on the soil bed and support the seed boot at the desired depth below the soil bed.

Preferably, the plough assembly further includes a fertiliser delivery tube located behind the digging shank.

Preferably, the actuator is operable to level the frame relative to the soil bed if a difference between the front and rear height signal exceeds the adjustment distance.

Preferably, the difference between the front and rear height signal is compared to the adjustment distance with a safety factor, such that the actuator is operable to level the frame relative to the soil bed before the difference exceeds the adjustment distance or a predetermined threshold.

Preferably, the frame has a length of between 2.5 m to 6 m.

Preferably, the frame has a width of between 3 m to 24 m. Preferably, the frame has a weight of between 3000 kg to 20000 kg.

BRIEF DESCRIPTION OF THE DRAWINGS

Preferred embodiments will now be described by way of example, with reference to the accompanying drawings, wherein.

DETAILED DESCRIPTION

Figure 1:
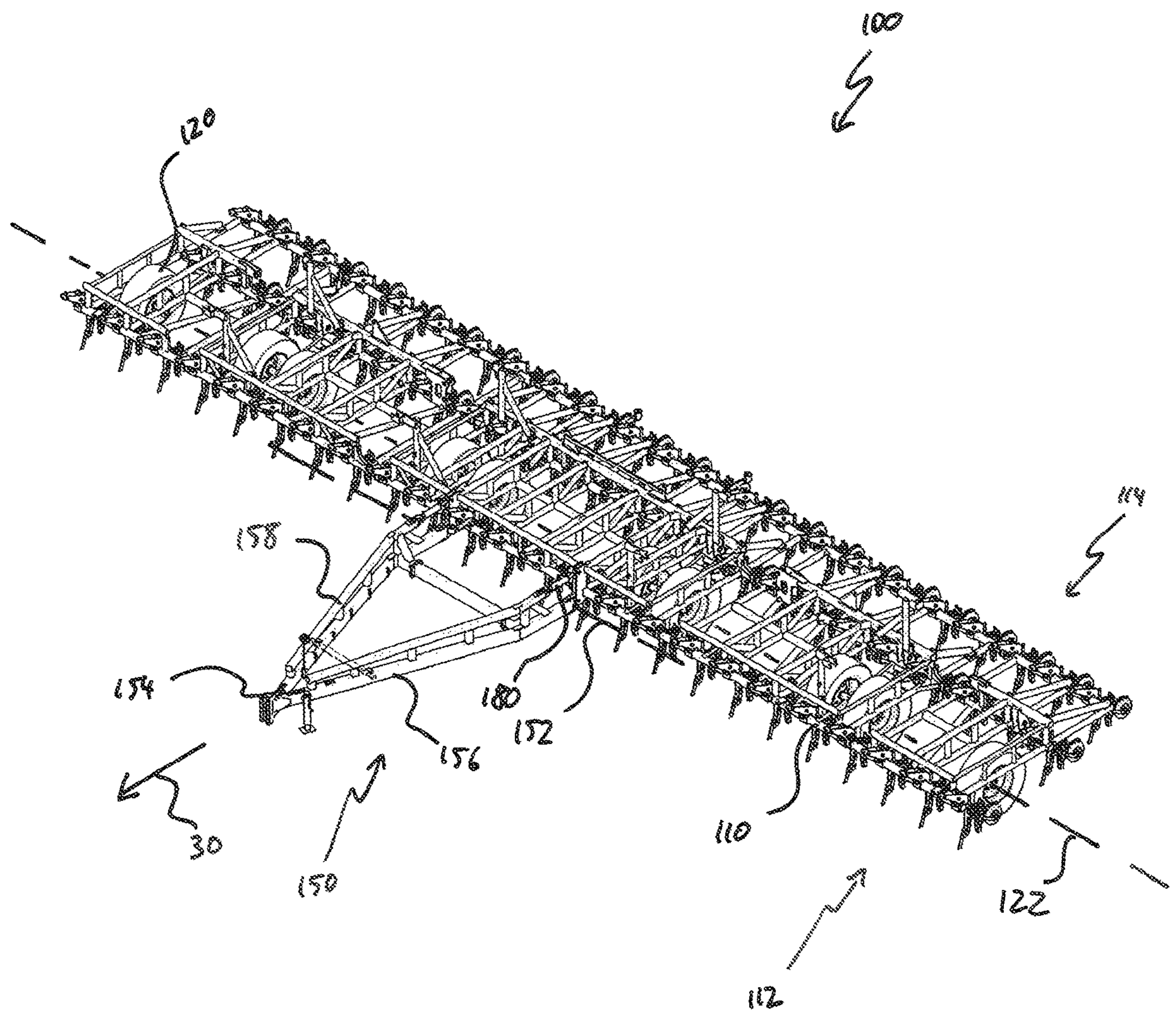
FIG. 1 shows an isometric view of a seeding tool according to a preferred embodiment.
Figure 3:
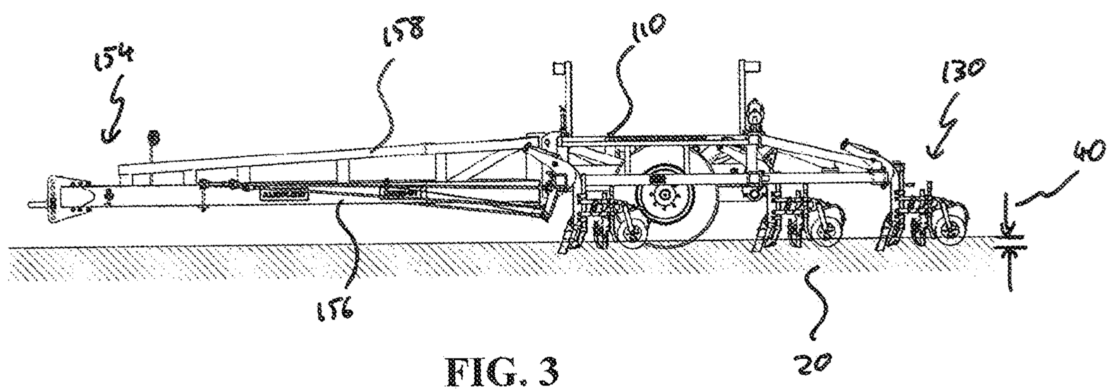
FIG. 3 shows a left side view of the seeding tool of FIG. 1.

As shown in FIG. 1, a seeding tool 100 according to a preferred embodiment includes a frame 110 supported by a frame wheel 120 so that the frame 110 is pivotable about a wheel axis 122. The seeding tool 100 is suitable for attachment to a vehicle (not shown) to be drawn through a soil bed 20 in a forward direction 30. The seeding tool 100 is configured for planting seeds in the soil bed 20 at a desired depth 40 for optimal growth conditions of the seed being planted, as shown in FIG. 3.

Figure 2:
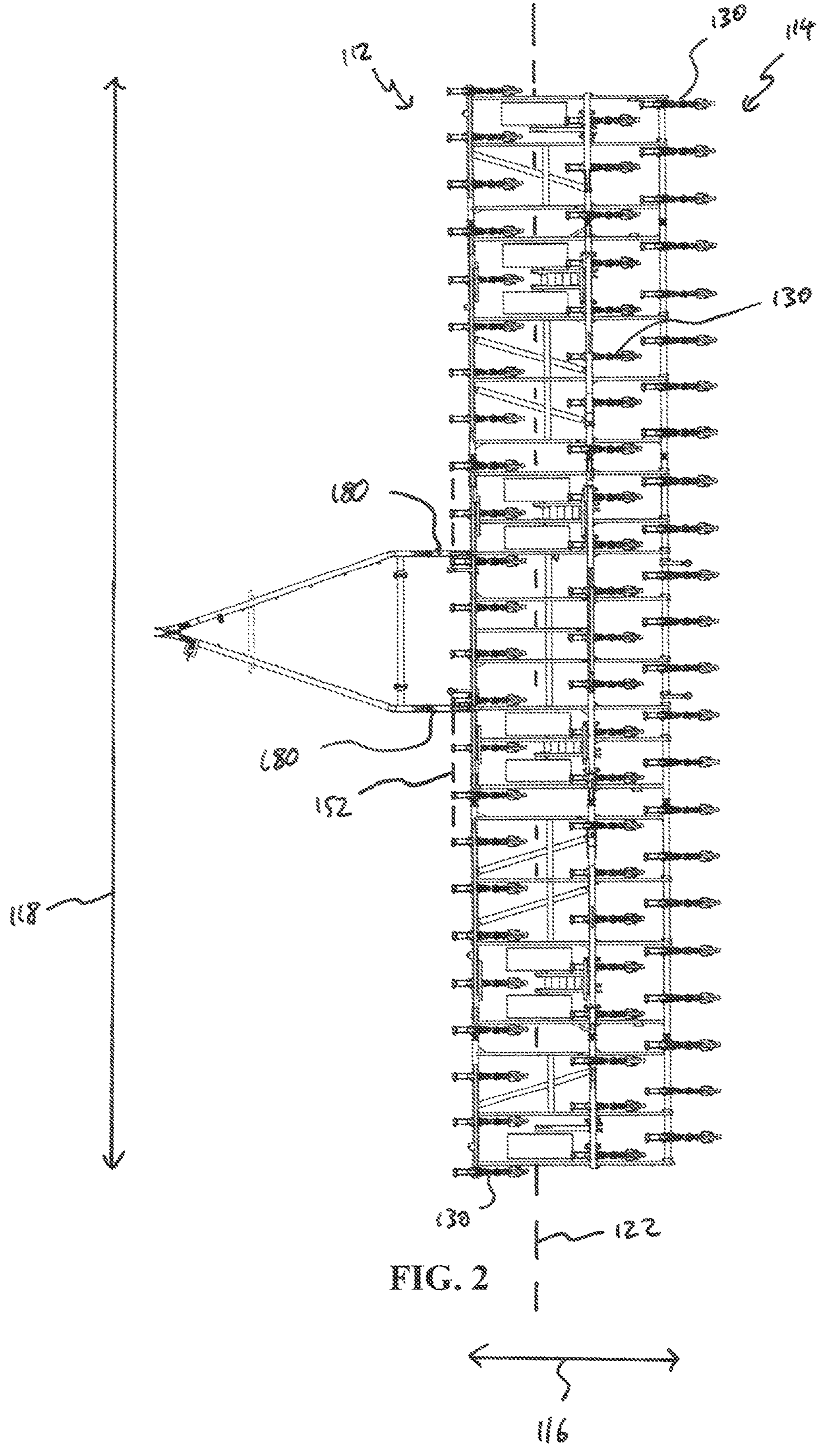
FIG. 2 shows a top view of the seeding tool of FIG. 1.

As shown in FIG. 2, a plurality of plough assemblies 130 are attached to a rear portion 114 of the frame 110, some plough assemblies 130 may also be attached to a front portion 112 of the frame. Although any number of plough assemblies 130 could be used with the frame 110, typically a large number are used to increase the number of rows being seeded by the seeding tool 100. The frame 110 is therefore relatively large, typically having a length 116 of about 2.5 to 6 metres, a width 118 of about 3 to 24 metres, and typically weighing between 3 to 20 tons (3000 to 20000 kg).

Figure 6:
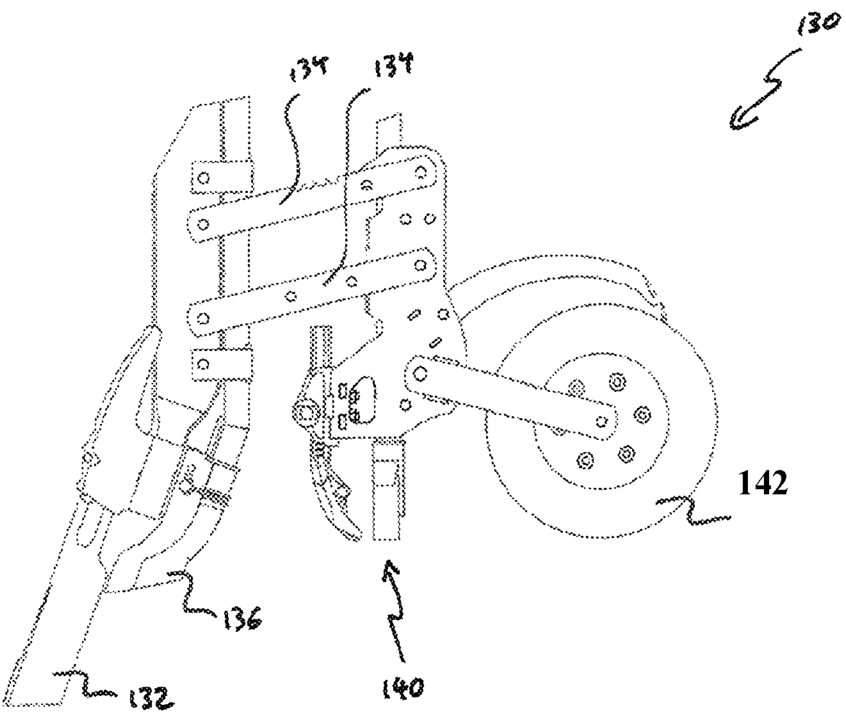
FIG. 6 shows a left side view of a plough assembly of the seeding tool of FIG. 1.
Figure 7:
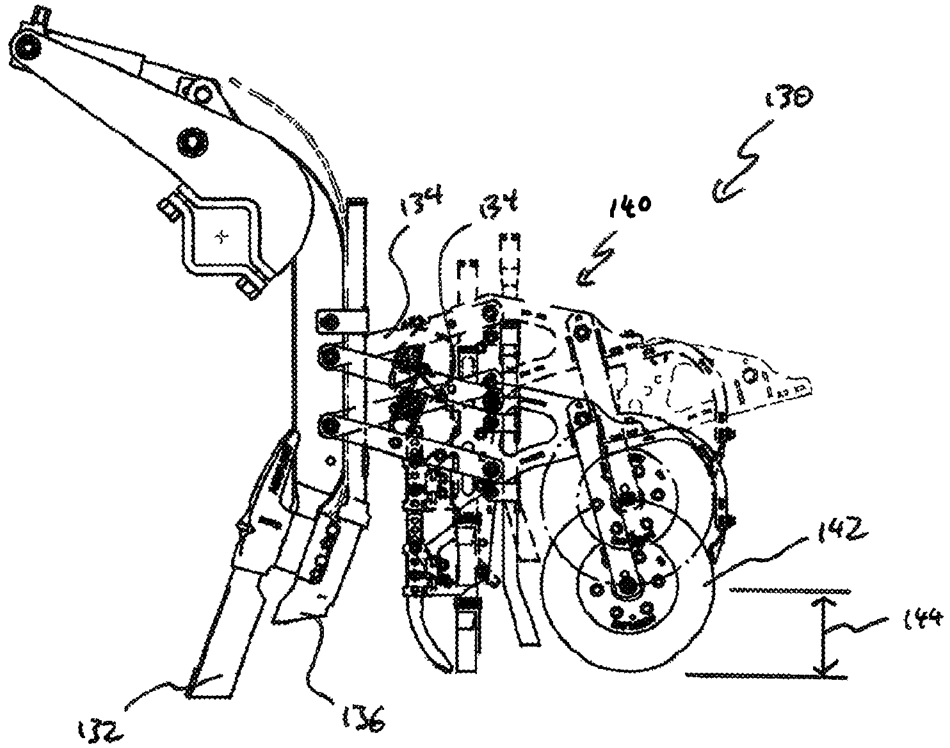
FIG. 7 shows a left side view of the plough assembly of FIG. 6 responding to local soil bed variations.

Moving briefly to FIG. 6 to discuss the plough assembly 130 in more detail, each plough assembly 130 includes a digging shank 132 to extend downwardly into the soil bed 20. Each plough assembly 130 also includes a seed boot 140 for planting seeds in the soil bed 20 at the desired depth The seed boot 140 is attached to the digging shank 132 by at least two spaced parallel beams 134 that are pivotally attached to the seed boot 140 and the digging shank 132. As a result of the parallelogram arrangement, the seed boot 140 is vertically movable relative to the digging shank 132 by an adjustment distance 144, as shown in FIG. 7, without changing the relative orientation between the seed boot 140 and the digging shank 132. Each plough assembly 130 further includes a press wheel 142 attached to the seed boot 140. The press wheel 142 presses on the soil bed 20, which supports the seed boot 140 at the desired depth 40 below the soil bed 20. The pressing of the press wheel 142 also closes a furrow (not shown) created by the digging shank 132, which provides desirable soil characteristics adjacent the seed planted by the seed boot 140. In some embodiments, each plough assembly 130 further includes a fertiliser delivery tube 136 mounted behind the digging shank 132.

Returning to FIG. 1, the seeding tool 100 further includes a fixed drawbar 150 hingedly attached to the front portion 112 of the frame 110 so that the drawbar 150 is pivotable about a drawbar axis 152. A fixed drawbar 150 is distinguished from a floating drawbar (not shown) in that there is no vertical displacement of the drawbar 150 relative to the vehicle. Floating drawbars typically do not suffer the disadvantages addressed by this disclosure, due to their ability to compensate using the vehicle connection. As seen in FIG. 2, the drawbar axis 152 is preferably substantially parallel to the wheel axis 122. Returning to FIG. 1, the drawbar 150 includes a coupling portion 154 for attaching the drawbar 150 to the vehicle. Extending from the coupling portion 154 is a lower beam 156 that is hingedly attached to the frame 110 to provide for the pivoting movement of the frame 110 about the drawbar axis 152. Also extending from the coupling portion 154 is an upper beam 158 that extends toward the frame 110. In this embodiment, the upper beam 158 is connected to a portion of the lower beam 156 proximate the coupling portion 154, and at various intervals between the coupling portion 154 and the frame 110.

The seeding tool 100 further includes an actuator 180 located between the fixed drawbar 150 and the frame 110. Preferably, the actuator 180 is hingedly connected to the upper beam 158 and hingedly connected to the frame 110, such that movement of the actuator 180 causes a moment about the hinged attachment of the lower beam 156 to the frame 110. The actuator 180 is operable to adjust an angle 182 between the fixed drawbar 150 and the frame 110. In a preferred embodiment, the drawbar 150 includes two upper beams 158 extending divergingly from the coupling portion 154, and two parallel actuators 180, each upper beam 158 having a respective actuator 180. Preferably, the lower beam 156 is adapted to resist axial forces during normal operation of the seeding tool 100, while the upper beam 158 is adapted to resist the moments applied when the actuator 180 adjusts the angle 182.

Figure 5:
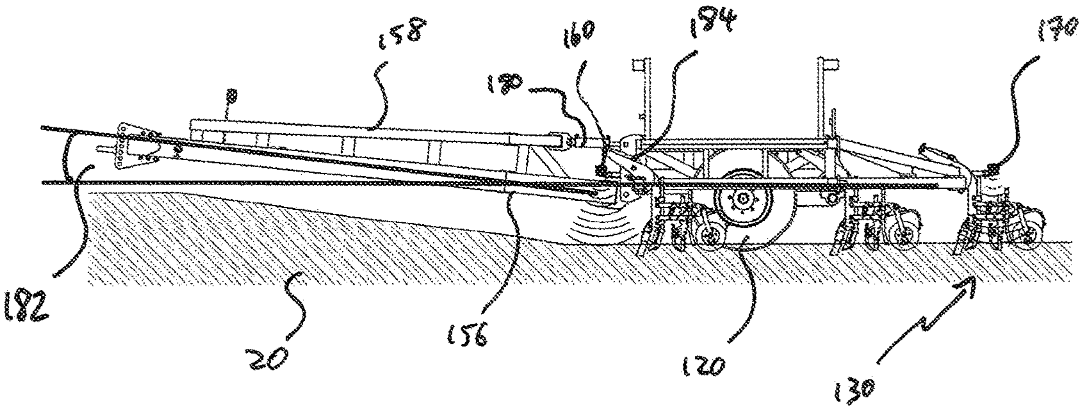
FIG. 5 shows a left side view of the seeding tool of FIG. 1 having levelled in response to the soil gradient change.

As best seen in FIG. 5, the seeding tool 100 further includes a front height sensor 160 attached to the front portion 112 of the frame 110 to provide a front height signal. The seeding tool 100 also includes a rear height sensor 170 attached to the rear portion 114 of the frame 110 to provide a rear height signal. The actuator 180 is then operable to adjust the angle 182 to level the frame relative the soil bed 20 based on the front and rear height signal. Preferably, the actuator 180 is a hydraulic actuator, and the seeding tool 100 further includes a hydraulic valve 184 to operate the actuator 180. The hydraulic valve 184 may be digitally controlled and receives the front and rear height signals, to the operate the actuator 180 to adjust the angle 182 relative to the soil bed 20. In a preferred embodiment, the actuator 180 is operable to level the frame 110 relative to the soil bed 20 to maintain the seed boot 140 at the desired depth 40 within a tolerance of ±5 mm. In another preferred embodiment, the front height sensor 160 includes a second front height sensor 162, a sensor 160, 162 being located on the frame 110 on either side of the drawbar 150. In this embodiment, the rear height sensor 170 also includes a second rear height sensor 172, a sensor 170, 172 being located on the frame 110 in either side of the drawbar 150. The actuator 180 is operable according to the input of all four sensors 160, 162, 170 ,172 to level the frame such that a difference between the height signals of the sensors 160, 162, 170, 172 is minimized.

In a preferred embodiment, the actuator 180 is operable to level the frame 110 relative to the soil bed 20 if a difference between the front and rear height signals exceeds the adjustment distance 144, which can also simply be a predetermined threshold value. In a more preferred embodiment, the actuator 180 is operable in parallel to the action of the plough assembly 130 along the adjustment distance 144. In this way, the plough assembly 130 is able to adjust the seed boot 140 in relation to small changes in the soil bed 20, while the actuator 180 is able to adjust the position of the entire plough assembly 130, including the digging shank 132 and/or the seed boot 140 in relation to larger changes in the soil bed 20. In another embodiment, the difference between the front and rear height signals is compared to the adjustment distance 144 with a safety factor. In this way, the actuator 180 operates to level the frame 110 before the difference exceeds the adjustment distance 144, as the operation of the actuator 180 may require a period of time, within which the difference may substantially exceed the adjustment distance 144, leading to the seed boot 140 being pushed in or pulled out of the soil bed 20 from the desired depth 40.

Figure 4:
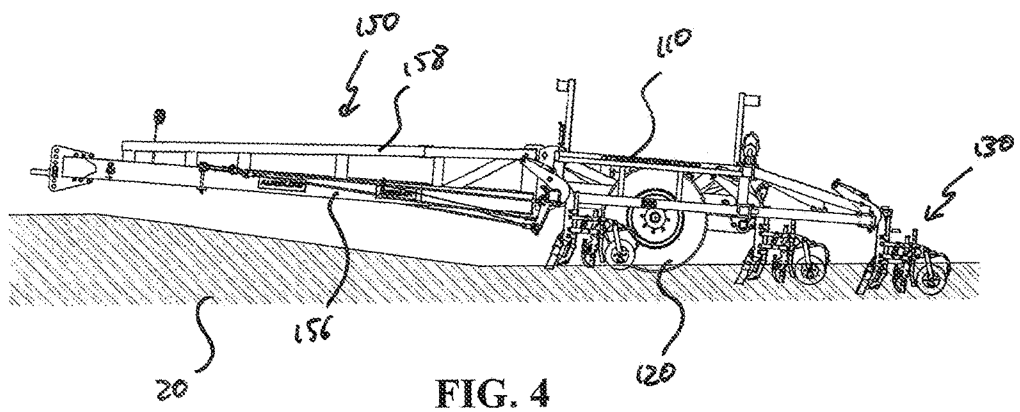
FIG. 4 shows a left side view of the seeding tool of FIG. 1 when facing a soil gradient change.

Thus, when the seeding tool 100 is used as shown in FIG. 3, the seed boots 140 of the plough assemblies 130 are operating at the desired depth 40. When the seeding tool 100 encounters a gradient change in the soil bed 20, as shown in FIG. 4, the frame 110 is pivoted about the wheel axis 122, causing the plough assemblies 130 mounted to the front portion 112 to be lifted up from the desired depth 40, and the plough assemblies 130 mounted to the rear portion 113 to be pushed into the soil bed 20 beyond the desired depth 40. Minor gradient changes that cause less movement than the adjustment distance 144 are compensable by the parallel beams 134 of the plough assembly 130, however larger gradient changes cannot be compensated by the plough assembly 130. If the difference between the front and rear height signals indicate a gradient change that is likely to exceed, or come dangerously close to exceeding, the adjustment distance 144, the actuator 180 is operated to adjust the angle 182 to the level the frame 110 relative to the soil bed 20, as shown in FIG. 5.

Figure 8:
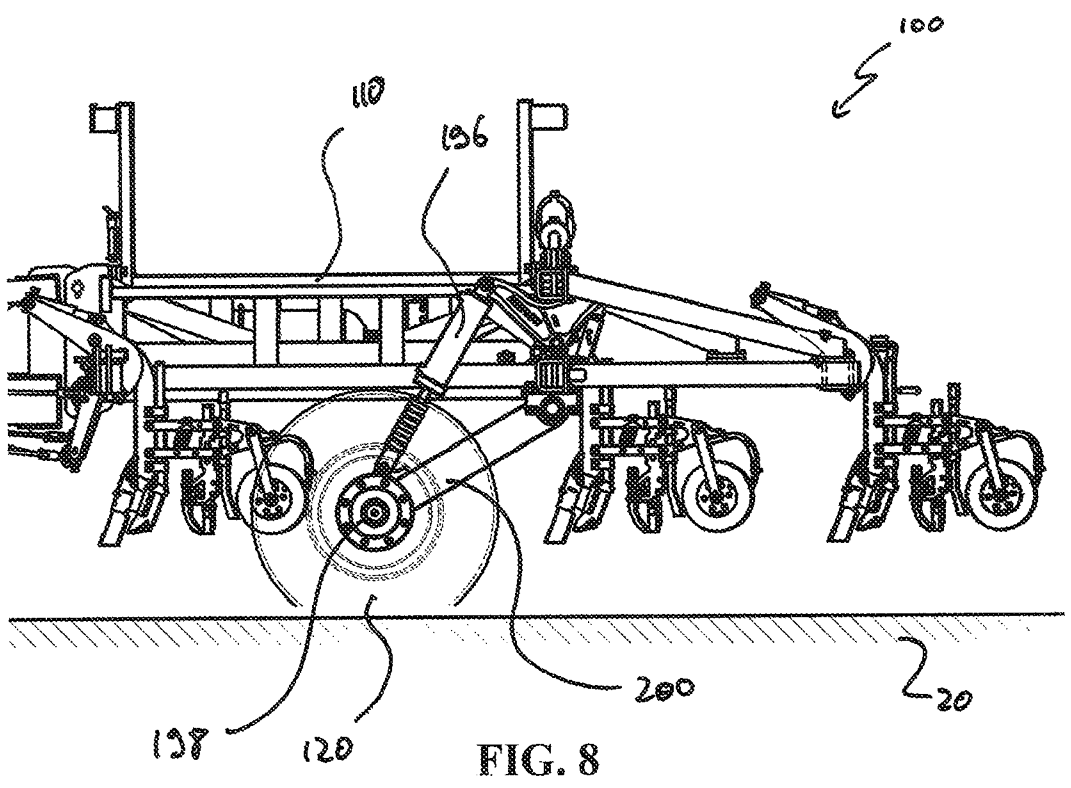
FIG. 8 shows a left side view of a seeding tool according to another preferred embodiment, with a frame wheel in a raised position.
Figure 9:
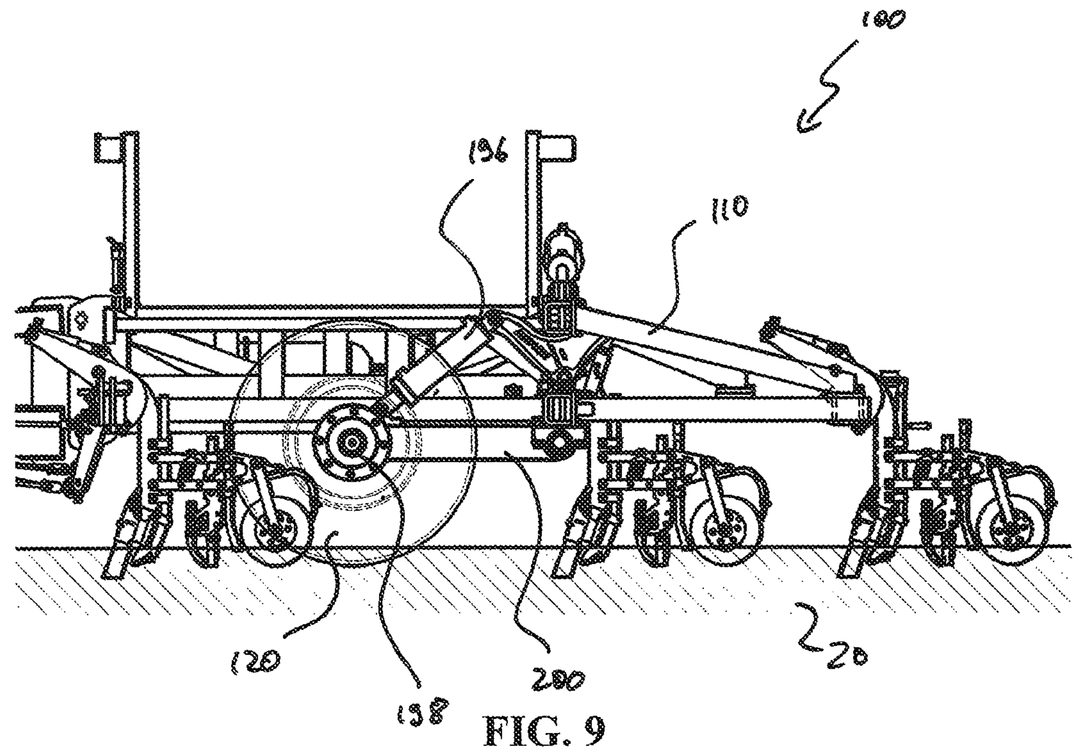
FIG. 9 shows a left side view of the seeding tool of FIG. 8, with the frame wheel in a lowered position.

In another preferred embodiment, as shown in FIGS. 8 and 9, the frame wheel 120 includes a wheel actuator 196 extending between a hub 198 of the frame wheel and the frame 110. Preferably, the frame wheel 120 is hingedly attached to the frame 110 using a bogie 200 that extends from the frame 110 and attaches to the hub 198. The actuator 196 preferably extends at an angle to the bogie 200, such that extension and/or retraction of the actuator 196 causes hinging movement of the bogie 200, causing an at least partially vertical movement of the frame wheel 120 relative to the frame 110 between a raised position shown in FIG. 8 and a lowered position shown in FIG. 9.

The actuator 196 is in one embodiment configured to be operable by the hydraulic valve 184, such that an adjustment of the height of the frame 110 relative to the soil bed 20 is possible using the digitally controlled hydraulic valve 184, for example in response to the front and rear height signals.

In another preferred embodiment, the hydraulic valve 184 is operated according to a control algorithm that associates the position of either or both actuators 180, 196 with the signals from the front and rear height sensors 160, 170 using a set of variables. Preferably, the set of variables is adjustable to account for the interaction of different types of soil bed 20 with the seeding tool 100. Preferably, the hydraulic valve 184 is configurable using two or more variable presets, each preset being associated with a type of soil bed 20, differentiating between, for example, "no till" pasture, "rocky ground", and "friable soil". Upon selection of a preset by a user, the hydraulic valve 184 is configured to operate the actuators 180, 196 in accordance with the set of variables stored in the preset.

Integers:

10 vehicle
20 soil bed
30 forward direction
40 desired depth
100 seeding tool
110 frame
112 front portion
114 rear portion
116 length
118 width
120 frame wheel
122 wheel axis
130 plough assembly
132 digging shank
134 parallel beams
136 fertiliser delivery tube
140 seed boot
142 press wheel
144 adjustment distance
150 fixed drawbar
152 drawbar axis
154 coupling portion
156 lower beam
158 upper beam
160 front height sensor
162 second front height sensor
170 rear height sensor
172 second rear height sensor
180 actuator
182 angle
184 hydraulic valve
196 actuator
198 frame wheel hub
200 bogie

What is claimed is:

1. A seeding tool for attachment to a vehicle to be drawn through a soil bed in a forward direction for planting seeds in the soil bed at a desired depth, the seeding tool including:

a frame supported by a frame wheel so that the frame is pivotable about a wheel axis;

a plough assembly attached to a rear portion of the frame, the plough assembly including a seed boot for planting seeds in the soil bed at the desired depth;

a fixed drawbar hingedly attached to a front portion of the frame so that the drawbar is pivotable about a drawbar axis that is parallel to the wheel axis;

a front height sensor attached to the front portion of the frame to provide a front height signal;

a rear height sensor attached to the rear portion of the frame to provide a rear height signal; and an actuator located between the fixed drawbar and the frame operable to adjust an angle between the fixed drawbar and the frame to level the frame relative to the soil bed based on the front and rear height signals;

wherein the plough assembly further includes:

a digging shank to extend downwardly into the soil bed, wherein the seed boot is pivotally attached to the digging shank, such that the seed boot is vertically movable relative to the digging shank by an adjustment distance; and a press wheel attached to the seed boot, to press on the soil bed and support the seed boot at the desired depth below the soil bed;

wherein the actuator is operable to adjust a position of the plough assembly to maintain the seed boot at the desired depth by leveling the frame relative to the soil bed if a difference between the front and rear height signals exceeds the adjustment distance.

2. The seeding tool of claim 1, wherein the front height sensor includes a first and a second front height sensor, and the rear height sensor includes a first and a second rear height sensor.

3. The seeding tool of claim 1, wherein the actuator is a hydraulic actuator, and the seeding tool further includes a digitally controlled hydraulic valve, adapted to operate the actuator to adjust the angle to level the frame relative to the soil bed.

4. The seeding tool of claim 1, wherein the actuator is operable to level the frame relative to the soil bed to maintain the seed boot at the desired depth within a tolerance of ±5 mm.

5. The seeding tool of claim 1, wherein the fixed draw bar includes:

a coupling portion for attaching the fixed draw bar to the vehicle;

a lower beam extending from the coupling portion and hingedly attached to the frame; and an upper beam extending from the coupling portion and hingedly connected to the actuator, such that movement of the actuator causes a moment about the hinged attachment of the lower beam to the frame.

6. The seeding tool of claim 1, wherein the seed boot is attached to the digging shank by at least two spaced parallel beams.

7. The seeding tool of claim 1, wherein the plough assembly further includes a fertiliser delivery tube located behind the digging shank.

8. The seeding tool of claim 1, wherein the frame has a length of between 2.5 m to 6 m.

9. The seeding tool of claim 1, wherein the frame has a width of between 3 m to 24 m.

10. The seeding tool of claim 1, wherein the frame has a weight of between 3000 kg to 20000 kg.

11. The seeding tool of claim 1, wherein the frame includes a frame wheel actuator extending between the frame and the frame wheel, the frame wheel actuator being operable to move the frame wheel at least partially vertically between a raised position and a lowered position.

12. The seeding tool of claim 11, wherein the frame wheel actuator is operable by a digital hydraulic valve.

13. The seeding tool of claim 12, wherein the digital hydraulic valve operates the frame wheel actuator based on the front and rear height signal to adjust a height of the frame relative to the soil bed.

* * * * *